(12) United States Patent
Kärkkäinen et al.

(10) Patent No.: US 10,686,771 B2
(45) Date of Patent: Jun. 16, 2020

(54) USER SIGN-IN AND AUTHENTICATION WITHOUT PASSWORDS

(71) Applicant: Gurulogic Microsystems Oy, Turku (FI)

(72) Inventors: Tuomas Kärkkäinen, Turku (FI); Ossi Kalevo, Akaa (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 16/333,401

(22) PCT Filed: Sep. 15, 2017

(86) PCT No.: PCT/EP2017/025257
§ 371 (c)(1),
(2) Date: Mar. 14, 2019

(87) PCT Pub. No.: WO2018/050293
PCT Pub. Date: Mar. 22, 2018

(65) Prior Publication Data
US 2019/0253402 A1     Aug. 15, 2019

(30) Foreign Application Priority Data
Sep. 15, 2016   (GB) .................................. 1615738.0

(51) Int. Cl.
*G06F 7/04* (2006.01)
*H04L 29/06* (2006.01)
*H04L 9/32* (2006.01)

(52) U.S. Cl.
CPC ............ *H04L 63/068* (2013.01); *H04L 9/321* (2013.01); *H04L 9/3228* (2013.01);
(Continued)

(58) Field of Classification Search
CPC ..... H04L 63/067; H04L 63/068; H04L 63/08; H04L 63/0861; H04L 63/0869;
(Continued)

(56) References Cited

U.S. PATENT DOCUMENTS 5,771,291 A     6/1998   Newton et al.
6,047,072 A     4/2000   Field et al.
(Continued)

FOREIGN PATENT DOCUMENTS

CN       101931623 A   * 12/2010
CN       101931623 A     12/2010
(Continued)

OTHER PUBLICATIONS

United Kingdom Intellectual Property Office, Intention to Grant under Section 18(4), Application No. GB1615738.0, dated Jul. 5, 2019, 2 pages.
(Continued)

*Primary Examiner* — Samson B Lemma
(74) *Attorney, Agent, or Firm* — Ziegler IP Law Group LLC (57) ABSTRACT

A data security system is provided. The data security system includes at least a first party and a second party that are mutually coupled via a data communication arrangement, wherein the data communication arrangement is operable to provide for user authentications and/or user sign-in. The first and second parties are provided with identical or mutually compatible copies of a digital key code list that includes keys and indexes referencing the keys. The first party is operable to deliver to the second party an authentication message including an index of a key to be derived, a unique identifier (ID) of a digital key code list from which the key is to be derived, and additional information indicative of at least one of: a unique user ID associated with the first party,
(Continued)

a session token previously-received from the second party, a date and time at which an attempt for user authentications and/or user sign-in is made. The additional information is provided in an encrypted form. The first and second parties are operable to use, when performing data communication therebetween, for providing user authentications and/or user sign-in, the key that is derived from the digital key code list based upon the index included within the authentication message, and to dispose of the key after use, wherein the key is arranged to be usable only once between the first and second parties.

19 Claims, 4 Drawing Sheets

(52) U.S. Cl.
CPC ............ *H04L 63/067* (2013.01); *H04L 63/08* (2013.01); *H04L 63/0861* (2013.01); *H04L 63/0869* (2013.01)

(58) Field of Classification Search
CPC ....... H04L 63/06; H04L 9/321; H04L 9/3228; H04L 9/08; G06F 21/31
USPC .......................................................... 726/6
See application file for complete search history.

(56) References Cited

U.S. PATENT DOCUMENTS

| | | | | |
|---|---|---|---|---|
| 10,454,674 | B1* | 10/2019 | Bar-El | .................. H04L 9/3242 |
| 2001/0019614 | A1* | 9/2001 | Madoukh | ............ G06F 21/6245 380/277 |
| 2008/0034216 | A1 | 2/2008 | Law | |
| 2009/0235069 | A1* | 9/2009 | Sonnega | ............... H04L 63/062 713/156 |
| 2013/0152179 | A1* | 6/2013 | Lee | .......................... G06F 21/31 726/6 |

FOREIGN PATENT DOCUMENTS

| | | |
|---|---|---|
| EA | 200501543 A1 | 4/2006 |
| EP | 2911365 A1 | 8/2015 |
| RU | 2011109211 A | 9/2012 |
| WO | 2007117131 A1 | 10/2007 |
| WO | 2011134807 A1 | 11/2011 |
| WO | 2016173124 A1 | 11/2016 |

OTHER PUBLICATIONS

Notification of First Office Action of Chinese Patent Application No. CN2017800568933 dated Aug. 5, 2019, 7 pages of English Translation.
Great Britain Intellectual Property Office, Combined Search and Examination Report under Sections 17 and 18(3), Application No. GB1615738.0, dated Mar. 29, 2017, 6 pages.
International Preliminary Report on Patentability, Application No. PCT/EP2017/025257, dated Dec. 11, 2018, 7 pages.
International Search Report and Written Opinion of the International Searching Authority, Application No. PCT/EP2017/025257, dated Nov. 22, 2017, 13 pages.
Written Opinion of the International Preliminary Examining Authority, Application No. PCT/EP2017/025257, dated Aug. 17, 2018, 7 pages.
Great Britain Intellectual Property Office, Examination Report under Section 18(3), Application No. GB1615738.0, dated Feb. 18, 2019, 4 pages.
Basic access authentication—Wikipedia, the free encyclopedia (accessed Apr. 22, 2019); URL: https://en.wikipedia.org/wiki/Basic_access_authentication, 3 pages.
Digest access authentication13 Wikipedia, the free encyclopedia (accessed Apr. 22, 2019); URL: https://en.wikipedia.org/wiki/Digest_access_authentication, 8 pages.
Kerberos (protocol)—Wikipedia, the free encyclopedia (accessed Apr. 22, 2019); URL: https://en.wikipedia.org/wiki/Kerberos_(protocol), 7 pages.
NT LAN Manager—Wikipedia, the free encyclopedia (accessed Apr. 22, 2019); URL: https://en.wikipedia.org/wiki/NT_LAN_Manager, 8 pages.
OAuth—Wikipedia, the free encyclopedia (accessed Apr. 22, 2019); URL: https://en.wikipedia.org/wiki/OAuth, 7 pages.
OpenID—Wikipedia, the free encyclopedia (accessed Apr. 22, 2019); URL: https://en.wikipedia.org/wiki/OpenID, 14 pages.
SPNEGO—Wikipedia, the free encyclopedia (accessed Apr. 22, 2019); URL: https://en.wikipedia.org/wiki/SPNEGO, 2 pages.
Secure Remote Password protocol—Wikipedia, the free encyclopedia (accessed Apr. 22, 2019); URL: https://en.wikipedia.org/wiki/Secure_Remote_Password_protocol, 7 pages.
Transport Layer Security—Wikipedia, the free encyclopedia (accessed Apr. 22, 2019); URL: https://en.wikipedia.org/wiki/Transport_Layer_Security#Client-authenticated_TLS_handshake, 33 pages.
List of HTTP status codes—Wikipedia, the free encyclopedia (accessed Apr. 22, 2019); URL: https://en.wikipedia.org/wiki/List_of_HTTP_status_codes, 13 pages.
Franks et al., RFC 2617—"HTTP Authentication: Basic and Digest Access Authentication" Open Market, Inc. Jun. 1999 (accessed Apr. 22, 2019); URL: https://tools.ietf.org/html/rfc2617, 35 pages.
GNU Privacy Guard—Wikipedia the free encyclopedia (accessed Apr. 22, 2019); URL: https://en.wikipedia.org/wik/GNU_Privacy_Guard, 7 pages.
Patent Office of the Russian Federation, Decision to Grant a Patent for an Invention, Application No. 2019106197/08, dated Dec. 26, 2019, 2 pages.

* cited by examiner

USER SIGN-IN AND AUTHENTICATION WITHOUT PASSWORDS

TECHNICAL FIELD

The present disclosure relates to data security systems. Moreover, the present disclosure also relates to methods of operating aforesaid data security systems. Furthermore, the present disclosure also relates to computer program products comprising a non-transitory computer-readable storage medium having computer-readable instructions stored thereon, the computer-readable instructions being executable by a computerized device comprising processing hardware to execute the aforementioned methods.

BACKGROUND

Passwords have been employed for centuries to enhance security, long before digital computers and information systems were invented. For example, previously-agreed passwords were used between messengers in Roman times for authentication purposes; passwords were used in battlefields for verifying that a given person approaching a guard post was a friend, and not a foe. Contemporary information society is heavily reliant upon use of passwords, for example for sign-in (i.e., signing-in) to computers, for sign-in to smart phones, for activating televisions, for accessing payment terminals, for inputting data into self-service library automats, and so forth. Moreover, passwords are also contemporarily used for verifying an authenticity of a user in many mutually different social services and social media services, in online banking, in operating systems, in e-mail servers and so forth.

In order to improve security in contemporary digital information systems, it is conventional practice to employ a plurality of different security methods, for example:
(i) Basic access authentication (Basic Auth., see reference [1]);
(ii) Digest access authentication (see reference [2]);
(iii) Kerberos protocol (see reference [3]);
(iv) NT LAN Manager (see reference [4]);
(v) OAuth (see reference [5]);
(vi) OpenID (see reference [6]);
(vii) Simple and Protected GSSAPI Negotiation Mechanism (SPNEGO, see reference [7]); and
(viii) Secure Remote Password protocol (SRP, see reference [8]);
(ix) Transport Layer Security (TLS) client-authenticated handshake (see reference [9]),
and so forth. Items (i) to (ix) above include trademarks.

Almost all contemporary protection methods that are based upon passwords suffer from known technical weaknesses. However, on account of various information leaks, data security breaches and disclosures that have targeted large data service providers, information security technology has advanced considerably in recent years. These breaches, leaks and disclosures have, in practice, forced information security experts to devise new types of security methods.

It is generally known that using passwords is necessary, and yet it causes various problems in modern society that depends upon information systems. Regardless of a type of information system or of a type of data security configuration that is employed, it is users of such information systems that eventually cause vulnerabilities in data security and information security, either because of their ignorance or because of their indifference. Almost daily, reports are published about broken user accounts, leaked passwords, about various types of malware which are used to extort money for return of personal private information stolen from a broken user account, and so forth.

Presently known user authentication technology is based upon transmitting a user identification and/or password to a server of a service provider or to a terminal device, using an encrypted data communication connection, wherein the security is principally based on certificates provided by trusted parties. It is contemporarily generally known that an encrypted connection does not guarantee that vital sign-in (i.e., signing-in) information of users is not accessible, in an unencrypted state, to malicious unauthorized parties; merely just one weak link in a chain of communication is potentially sufficient to leak the vital sign-in information to the malicious unauthorized parties.

Despite measures taken to secure data, it is generally known that the Internet® (operating pursuant to Internet Protocol (IP), such as Transmission Control Protocol (TCP) and User Datagram Protocol (UDP), but not limited thereto) as a global information network makes it possible not only for superpowers, but also for many multinational companies, to spy on people and to track their activity, because each time that contemporary information systems are used, digital meta traces are left behind. These digital meta traces or passive digital footprints can always, with high probability, be tracked and connected with an individual unique user who is possibly, for example, a legal person. The tracking can be performed even retroactively, given enough computing resources.

It is also generally well-known that current national legislation cannot distinctly have an effect on multinational software arrangements that centralize their associated authorization, namely also their associated sign-in (i.e., signing-in) processes, onto servers of producers, that usually reside in a territory of a foreign nation and the legislation of which may thus be in conflict with the legislation of the nation in which the service is actually being used. As a result, the Internet has become a battlefield in a new type of war, where several nations attempt to protect their citizens by passing new laws that would prevent their citizens from using services provided by an infrastructure (namely, network nodes and servers) that is controlled by foreign nations, ostensibly for reasons of national security. In other words, a variance of national laws in relation to international agreements can potentially create security uncertainties, for example in a situation where a given data server is centralized in one nation and there are no unified rules in other nations with which the given data server interacts.

Moreover, it is a contemporary problem that personal accounts are broken into, or personally sensitive information is stolen. However, there are not often simple and distinct contemporary approaches to address such problems. Moreover, for many users, it is often almost impossible to adapt to using complex tools and procedures, such as encrypting e-mails by using Pretty Good Privacy (PGP®) model or similar types of encryption, both in the abstract sense and regarding the technical procedures. Therefore, it is desirable in practice that it should never be the main responsibility of a given user to protect his or her information against malware and unauthorized access, because contemporary users range from young children to senior citizens; such people rarely pay attention to security issues when they fulfill their various online needs, for example social media interactions and on-line shopping activities.

In a published United States patent document US 2013/0152179 A1 (LEE et al.; "System and Method for User Authentication Using One-time Identification"), there is described a system for user authentication using One-Time IDentifications (OTIDs), including a client terminal configured to generate a number of OTIDs that are used in the user authentication, and to sequentially select one of the generated OTIDs to use the selected OTID as a user identification in each authentification session. Moreover, the system includes an authentication server configured to receive from the client terminal and store the generated OTIDs; when the selected OTID and a secret key are received, inquire the OTID in a database, and determine whether a secret key that is associated with the inquired OTID and stored in the database match with the received secret key to perform the user authentication.

In a published WO patent document WO 2007/117131 A1 (Trust Integration Services B.V.; "Arrangement of and Method for Secure Data Transmission"), there is described a method and system for secure data transmission between a client and a third-party computer arrangement. The method includes: a) authenticating a user of the client by a security server via a communication session; b) making available a key pair by the security server, the key pair including a public key and a private key; c) performing the secure data transmission between the client and the third-party computer arrangement while using the key pair. The key pair has a limited life time defined by: a predetermined duration in time, or a predetermined number of communication sessions, or a predetermined number of actions.

In a published United States patent document US 2008/034216 A1 (Eric Chun Wah Law (US); "Mutual Authentication and Secure Channel Establishment between Two Parties Using Consecutive One-time Passwords"), there is described a communication system and method configured for mutual authentication and secure channel establishment between two parties. A first party generates a first one-time password and sends it to a second party. The second party authenticates the first party by generating a one-time password using the same algorithm, secrets and parameters, and matches it with the received first one-time password. If the received first one-time password matches with the generated password, the second party generates a consecutive one-time password, and establishes a secure channel to the first party using the consecutive one-time password. The first party generates a consecutive one-time password and authenticates the second party by successfully communicating with the second party using the secure channel.

In a published EP patent document EP2911365 (A1) (Dejamobile (FR); "Method and System for Protecting Transactions Offered by a Plurality of Services between a Mobile Device of a User and an Acceptance Point"), there is described a method for securing a transaction of a service between a mobile device of a user and an acceptance point. The method includes creating, on a security server, at least one token for a given service and a user service, each token having a value, wherein each token is encrypted. The method further includes transmitting, by the security server, the encrypted token to the mobile device, and storing the encrypted token at the mobile device during a transaction between the mobile device and the acceptance point. The method further includes transmitting the encrypted token previously stored from the mobile device to the acceptance point. The method further includes decrypting, at the acceptance point, the encrypted token, and verifying that the decrypted token is valid for the transaction.

SUMMARY

The present disclosure seeks to provide an improved data security system.

Moreover, the present disclosure seeks to provide an improved method of operating a data security system.

A further aim of the present disclosure is to at least partially overcome at least some of the problems of the prior art, as aforementioned.

In a first aspect, embodiments of the present disclosure provide a data security system including at least a first party and a second party that are mutually coupled via a data communication arrangement, wherein the data communication arrangement is operable to provide for user authentications and/or user sign-in, characterized in that:

(i) the first and second parties are provided with identical or mutually compatible copies of at least one digital key code list that includes keys and indices referencing the keys;

(ii) the first party is operable to deliver to the second party an authentication message including, instead of a key, an index of the key, a unique identifier (ID) of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and (iii) the first and second parties are operable to use, when performing data communication therebetween, for providing user authentications and/or user sign-in, the key that is derived from the digital key code list based upon the index included within the authentication message, and to dispose of the key after use, wherein the key is arranged to be usable only once between the first and second parties.

The aspects of the disclosed embodiments are of advantage in that the first and second parties are operable to perform the data communication therebetween, without a need to encrypt or protect the key being used or its index, as the key is disposable and is usable only once.

Pursuant to embodiments of the present disclosure, the user authentications and/or the user sign-in are executed automatically, without any user actions, as no passwords are required to be delivered.

In a second aspect, embodiments of the present disclosure provide a method of operating a data security system including at least a first party and a second party that are mutually coupled via a data communication arrangement, wherein the data communication arrangement is operable to provide for user authentications and/or user sign-in, characterized in that the method includes:

(a) providing the first and second parties with identical or mutually compatible copies of at least one digital key code list that includes keys and indices referencing the keys;

(b) arranging for the first party to be operable to deliver to the second party an authentication message including, instead of a key, an index of the key, a unique identifier (ID) of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and (c) arranging for the first and second parties to be operable to use, when performing data communication therebetween, for providing user authentications and/or user sign-in, the key that is derived from the digital key code list based upon the index included within the authentication message, and to dispose of the key after use, wherein the key is arranged to be usable only once between the first and second parties.

In a third aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In the following, descriptions of example embodiments of the disclosure are provided, wherein following acronyms and definitions are used in the descriptions, as follows:

Basic Auth. In a given example HTTP (hypertext transfer protocol) transaction, a basic access authentication is used for an HTTP user agent to provide a user name and password when making a request.

Digest Auth. Digest access authentication is one of a plurality of agreed-upon methods that a web server can use to negotiate credentials, such as a username or a password, in connection with a user's web browser.

Kerberos A computer network authentication protocol that works on a basis of 'tickets'.

NFC Near-Field Communication, usually near-field wireless communication, for example BlueTooth®. A wireless communication range of up to 100 metres is customarily provided by contemporary near-field communication, using wireless transmission power in an order of mW's.

NTLM A suite of Microsoft security protocols that provides authentication, integrity, and confidentiality to users.

OAuth An open standard and a decentralized authentication protocol.

OpenID Allows users to be authenticated by co-operating sites, using a third party service.

PGP Pretty Good Privacy, namely a contemporary encryption and decryption software product.

GPG GNU Privacy Guard is a free software replacement for PGP.

PKI Public key infrastructure.

SPNEGO Simple and Protected GSSAPI Negotiation Mechanism; a GSSAPI "pseudo mechanism" is used by a client-server software arrangement to negotiate a choice of security technology.

SRP Secure Remote Password protocol (SRP) is an augmented password-authenticated key agreement (PAKE) protocol.

TLS Transport Layer Security Client, namely an authenticated TLS handshake arrangement.

The aforementioned acronyms potentially include trademarks.

In a first aspect, embodiments of the present disclosure provide a data security system including at least a first party and a second party that are mutually coupled via a data communication arrangement, wherein the data communication arrangement is operable to provide for user authentications and/or user sign-in, characterized in that:

(i) the first and second parties are provided with identical or mutually compatible copies of at least one digital key code list that includes keys and indices referencing the keys;

(ii) the first party is operable to deliver to the second party an authentication message including, instead of a key, an index of the key, a unique identifier (ID) of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and (iii) the first and second parties are operable to use, when performing data communication therebetween, for providing user authentications and/or user sign-in, the key that is derived from the digital key code list based upon the index included within the authentication message, and to dispose of the key after use, wherein the key is arranged to be usable only once between the first and second parties.

Throughout the present disclosure, the term "first party" or the term "second party" is used to refer to an enterprise, to a person or to a software component owned and used by an identified user. In an example embodiment of the present disclosure, at least one of the first and second parties is a service, for example such as a data delivery service, a content delivery service, a banking service, a financial transaction service and similar. Moreover, a software component can be, for example, a software application, a part of a software application, a layer of software providing an operating environment for other software applications (for example, a support layer in a communication protocol stack).

It will be appreciated that the terms "first", "second" and like terms herein do not denote any specific role or order or importance, but rather are used to distinguish one party from another. In other words, the first party and the second party can act as a transmitting party and a receiving party, respectively, at a given point of time, and can act as a receiving party and a transmitting party, respectively, at another point of time.

Pursuant to embodiments of the present disclosure, the user authentications and/or the user sign-in are executed automatically, without any user actions, as no passwords are required to be delivered in such a manner of operation. Instead, the first party is operable to deliver to the second party a key index (namely, the index of the disposable key) along with the aforesaid additional information within the authentication message.

Optionally, the unique ID of the digital key code list is a serial number assigned to the digital key code list.

Optionally, the additional information is encrypted using precisely that encryption key whose index is delivered during the authentication. Alternatively, optionally, the additional information is encrypted using some other encryption key, for example a next key in the key code list, in which case a fact that the next key is used is already known to the second party. Yet alternatively, optionally, the additional information is encrypted using another encryption key, whose index is delivered separately.

As mentioned earlier, the additional information is indicative of at least one of: the unique user ID associated with the first party, the session token previously-received from the second party, the date and time at which the attempt for user authentications and/or user sign-in is made. It will be appreciated that the unique user ID is optional (namely, is not required to be delivered) if the digital key code list already refers to the unique user ID. In other words, the unique user ID is not required to be delivered if the digital key code list is a unique key code list and is identified as being associated with the unique user ID. Optionally, in this regard, the digital key code list is associated with the unique user ID at the time when the first and second parties are provided with the identical or mutually compatible copies of the digital key code list.

It is beneficial in the authentication to transmit the additional information indicative of the session token or of the date and time, so that it can be verified that the key has been used correctly and that the authentication message is not outdated.

Throughout the present disclosure, the term "session token" refers to a unique session identifier that is generated and sent from the second party to the first party to identify a current interaction session between the first and second parties. Optionally, the second party is operable to generate and send, to the first party, the session token at a beginning of the interaction session, wherein the session token is sent in an encrypted form. Optionally, in this regard, the second party is operable to encrypt the session token using an encryption key from the digital key code list, and to send an index of the encryption key to the first party. Optionally, the first and second parties are operable to use the encryption key based upon the index, and to dispose of the encryption key after use, wherein the encryption key is arranged to be usable only once between the first and second parties.

Such session tokens are particularly beneficial in situations where a current sign-in session is desired to be kept open (namely, active) for a pre-defined time period or until a pre-defined goal has been met. As an example, a given sign-in session may expire after a preset time of inactivity, which may be from a few minutes to a few hours. As another example, a given sign-in session may expire after a customer has placed a purchase order on an online store.

Optionally, when performing subsequent data communication during the same interaction session, the first party is operable to send subsequent data along with the additional information indicative of the session token. Optionally, in such a case, at least the additional information is provided in an encrypted form. Optionally, both the subsequent data and the additional information are provided in an encrypted form.

It will be appreciated that session tokens are typically employed, for example, when the first party is a client and the second party is a server. Optionally, in such a case, the first party (for example, the client) is required to store and handle only the session token, while all session data related to the current interaction session is linked to the session token, and is stored at the second party (for example, at a database associated with the server). Typically, the client does not have direct access to the session data stored at the server. Moreover, optionally, the second party is operable to store the session data in a compressed form, so as to improve efficiency and allow for more session data to be stored. In such a case, the second party is operable to decompress the session data later when the information indicative of the session token is received from the first party.

Moreover, optionally, the digital key code list is implemented by way of a key container or a key generator that is capable of storing and/or generating disposable keys based upon their indices.

It will be appreciated that various different implementations for a concept referred to as "key code list" in this disclosure are merely a few examples for how such a key code list, also referred to as a "key container" or a "key generator", may be implemented; many other ways are possible. The term used for the list of keys used in this disclosure is "key code list", but it will be appreciated that it may refer to many kinds of implementations. One of the implementations may be a list that contains indices and keys to which the indices refer. Another implementation may be a key generator to which a key index is signalled and which then returns a key matching that index, in a repeatable and reproducible manner, namely, in a manner that the key generator always produces the same key with the same index.

Optionally, in this regard, the digital key code list is implemented by way of a digital encryption key wallet, for example, such as an encryption key wallet described in a patent document PCT/EP2016/025042 (Applicant—Gurulogic Microsystems Oy), wherein there is described in detail how an arrangement produces, directly or via a trusted third party, an encryption key wallet that can be used securely between two or more communicating parties. Such a key wallet is optionally a dynamic key code list.

Optionally, the digital key code list is provided statically.

It will be appreciated that embodiments of the present disclosure are concerned with authentication that is used, for example, in one or more sign-in processes, for example in a plurality of sign-in processes. In operation, data is delivered securely in an encrypted manner, wherein authentication associated with the data is usually implemented from one given user to another given user or to a service. However, optionally, pursuant to embodiments of the present disclosure, a device is authenticated, or an authentication is implemented in respect of a software component or module such as an application, service or subroutine, for making use of the software component or module.

Moreover, optionally, an index of a given key is delivered using one or more characters or numbers, which are optionally inserted into the authentication message in one or more parts. It will be appreciated that, often, it requires fewer bits to transmit an index referencing a key than to transmit the key itself. Moreover, it will be appreciated that it is more secure to transmit key indices rather than the keys themselves, even when the keys are encrypted.

According to an embodiment of the present disclosure, the key is selected for use by any one of: the first party, the second party, or a trusted third party. In some implementations, the first party (namely, the transmitting party) selects the key to be used. In other implementations, a trusted third party selects the key to be used, and communicates to the first and second parties the key index referencing the selected key.

In yet other implementations, the second party (namely, the receiving party) selects the key to be used, and communicates to the first party the key index referencing the selected key. It will be appreciated that the selected key is never delivered; in contradistinction, delivery of keys are an operating characteristic of known types of data security systems.

Optionally, the first party (namely, the transmitting party) is operable to select the key to be used, independently of the second party (namely, the receiving party), provided that it is known that the first and second parties are provided with identical, or otherwise compatible, copies of the same digital key code list; for example, by "compatible" is meant that the key code lists are mutually different, but are capable of being employed in cooperation for implementing embodiments of the present disclosure. Alternatively, optionally, if it is not known that the first and second parties are provided with identical copies of the same digital key code list or if a method used in data communication requires, then negotiations are pursued between the first and second parties to establish which key is to be used.

According to an embodiment of the present disclosure, the first party is operable to use a key that is not yet provided to the second party. In such a case, the key is fetched from a producer of the digital key code list in real-time, or near real-time (for example, within seconds (for example, less than 60 seconds)). Such a manner of operation allows the first and second parties to sign-in to various information systems and services, for example information systems and services that are authorized by a trusted third party. Optionally, one party is operable to deliver to another party, by utilizing a conventional sign-in method, a digital key code list that is to be used for sign-in procedures that are performed later between the first party and the second party.

Moreover, if the second party (namely, the receiving party) knows (namely, has information that enables the receiving party to determine) the key to be used or its index, irrespective of whether the key was selected by the second party or a trusted third party, then it is not even necessary for the first party (namely, the transmitting party) to transmit the key index together with data to be communicated, for example such as sign-in (i.e., signing-in) information, or within the authentication message being communicated to the second party (namely, the receiving party). However, it is often advantageous to transmit the key index even in cases when the second party (namely, the receiving party) knows (namely, has information that enables the receiving party to determine) the key index, so as to avoid confusion between several sign-in (i.e., signing-in) attempts or several messages that are made or received within a short period of time.

Pursuant to embodiments of the present disclosure, the first and second parties are operable to perform the data communication therebetween, without a need to encrypt or protect the key index. It will be appreciated that when conventional methods involve delivering a key between parties, the key needs to be communicated in an encrypted form; however, an index of the key when communicated pursuant to embodiments of the present disclosure does not need to be delivered in an encrypted form. In some implementations of the present disclosure, a transmitting party does not necessarily require any information to be transmitted when initiating an interaction with a receiving party, but merely requires entering into contact for a first time; in such a case, the two parties communicate, namely transmit messages in a manner pursuant to embodiments of the present disclosure, when the interaction between them has been initiated.

In an example scenario of a conventional known system, in comparison, where a malicious third party manages to hijack an authentication message, the malicious third party can sign-in with that message in a case when sign-in information (including a user password) and a key used to encrypt the sign-in information are delivered in the message and the key is unencrypted.

In contradistinction, pursuant to embodiments of the present disclosure, the transmission and delivery of user identifications and passwords is avoided. It will be appreciated that it is beneficial to transmit the aforementioned additional information, in addition to the key index and the unique identification of the digital key code list, so that the authentication is even more secure. As mentioned earlier, such additional information can be encrypted using the key referenced by the key index, a next key in the key code list, or another encryption key whose index is delivered separately.

It will be appreciated that pursuant to embodiments of the present disclosure, the entire sign-in (i.e., signing-in) process can be executed using a public unprotected network connection, because no such information is acquired about the first and second parties that could be used to identify the first and second parties. Moreover, as the keys are disposable and used only once, malicious parties cannot even retroactively track and record the sign-in process between the authorized first and second parties. However, it will be appreciated that, in embodiments of the present disclosure, it is desirable that later keys cannot be readily anticipated from earlier keys; in other words, subsequent later keys are beneficially not a simple mathematical progression from earlier keys, such that a malicious third party could recognize a trend in temporal evolution of the keys. Optionally, a sequence of keys employed varies stochastically (i.e., randomly or pseudo-randomly) in value.

It will be appreciated here that it is possible that a key used by the first and second parties could be broken retroactively. However, the key is neither usable in future sign-ins, nor is it of use in cracking past sign-ins, because keys used during the sign-ins are disposable and are used only once, namely usable only once. Thus, in embodiments of the present disclosure, even if the message could be hacked by a malicious third party, it does not contain any such information (for example, such as a user ID along with a password) that could be reused as such. Next time, the message would in any case need to be encrypted using a different key. The information is therefore implemented such that it cannot be used later for signing-in to a respective, or any other system.

Moreover, optionally, the first and second parties are operable to use a same key for encrypting the additional information and subsequent data being communicated after the sign-in process. Alternatively, optionally, different keys are selected for authentication and for subsequent data communication. Optionally, in this regard, the subsequent data communication uses a next key in the key code list, in which case a fact that the next key is used is known to the receiving party. Alternatively, optionally, the subsequent data communication uses another encryption key, whose index is delivered separately. Optionally, keys are changed for each message that is communicated. As a result, their indices are also changed for each message that is communicated. The indices are either delivered, or are implicitly known to the receiving party, namely the keys are used in a specific order. In such a case, the first and second parties employ a same encryption algorithm during the sign-in (i.e., signing-in) process and subsequent data communication. This enables a straight-forward usage of the digital key code list, and potentially ensures a simple and uncluttered functionality and complete integration of the sign-in process and the subsequent data communication. This also makes it possible to implement a considerably more secure and uncomplicated communication arrangement between the first and second parties. Such operation is highly beneficial as compared to conventionally known approaches for providing data security, wherein the conventionally known approaches employ in operation several components designed and/or manufactured by several different providers that are superficially secure, but whose overall protection is reduced because such components lack a technical implementation and integration between various interfaces.

The data security system pursuant to embodiments of the present disclosure not only secures the signing-in process, but also user authentication. During a sign-in process, a user identification of a given user, of course, does take place. However, at the same time, user permissions of the given user are also detected.

The data security system is operable to verify software components mutually, which creates a device-independent and platform-independent system for securing data and for authenticating users.

It will be appreciated that a practical implementation of a data security system that is intended to be platform-independent is beneficially designed as a comprehensively secure solution that encompasses various interfaces between hardware and associated surrounding "ecosystems". Such a comprehensively secure solution must not allow utilization of a component that is not sufficiently secure, namely a component that is a weak link in respect of data security. For this purpose, one implementation of embodiments of the present disclosure uses one or more security measures, alone or in combination, that a device manufacturer intended to be used, for example, such as biometric identification of a user using a fingerprint reader, voice recognition, iris recognition, genome data and similar. It will be appreciated that the user does not need to insert any master passwords; instead, the data security system is based upon unique personal information that can be read using an interface provided by the device manufacturer. Employing biometric identification makes it possible for a user device to verify a software arrangement operating in the ecosystem and to allow this software arrangement to access a digital key code list that includes keys and their corresponding indices. Examples of such user devices include, but are not limited to, mobile phones, smart telephones, personal wearable electronic digital devices (for example, smart watches), Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, and interactive entertainment devices, such as game consoles, Television (TV) sets and Set-Top Boxes (STBs).

Thus, according to an embodiment of the present disclosure, the data security system is operable to allow access to the digital key code list based upon biometric identification of users associated with the first and second parties. As an example, in a smart phone, a user can employ his/her fingerprint to gain access to a digital key code list provided to the smart phone.

According to an embodiment of the present disclosure, the first and second parties are mutually authorized and authenticated.

According to an embodiment of the present disclosure, the digital key code list is provided by the first party or the second party.

According to another embodiment of the present disclosure, the digital key code list is provided by a trusted third party.

Moreover, optionally, the digital key code list is delivered to the first party and/or the second party by using encrypted e-mail messages (for example, by way of using approaches such as GNU Privacy Guard; see reference [12]).

Optionally, the first party (namely, the transmitting party) is operable to perform the data communication anonymously, when the digital key code list is provided by the trusted third party. In such a case, even though the first and second parties communicate anonymously in operation, the first and second parties are confirmed as authorized parties by the trusted third party. In other words, when it is desirable for the first party (namely, the transmitting party) to remain anonymous to the second party (namely, the receiving party), but still remain trusted, for example as regards sign-in (i.e., signing-in), then the first and second parties are provided with a digital key code list generated by the trusted third party, whereby the first and second parties use keys that are derived from the digital key code list provided by the trusted third party.

However, if the first and second parties wish to be anonymous to other third parties, then the first and second parties are provided with a digital key code list generated by one of the first and second parties, whereby the first and second parties use keys that are derived from this digital key code list. In such a case, no third party would be aware of who is communicating with whom, even though the first and second parties would know about each other. Such an approach is beneficially utilized especially in cases where a given service provider, namely a receiving party, wishes to identify a service user, namely a transmitting party, for example during a signing-in process, in which case both the given service provider and the service user are operable to use the digital key code list generated and provided by the service provider.

Optionally, a first digital key code list generated by a trusted third party is used in combination with a second key code list generated by any one of the first and second parties, in a form of a hybrid key arrangement.

Beneficially, a producer of the digital key code list independently produces very strong keys and stores these keys into the digital key code list.

In overview, embodiments of the present disclosure are operable to make transactions executed via the public Internet®, for example employing Internet Protocol (IP), considerably more secure. In embodiments of the present disclosure, users associated with transmitting parties do not need to deal with, namely do not need to be concerned about, user identification and/or passwords when signing into services provided by receiving parties. The authentication message can potentially include any conceivable information; however, beneficially, sensible (namely, appropriate) information is employed such that it does not need to include a user ID and a password of a user associated with a particular party signing into a service, but is sufficient to identify the particular party, namely for user authentication purposes. In this regard, the authentication message includes a unique ID of a digital key code list being used, a key index from the digital key code list, and additional information indicative of at least one of: a unique user ID associated with the particular party, a session token received from the service, a date and time at which an attempt for user authentications and/or user sign-in is made, wherein the additional information is provided in an encrypted form.

In embodiments of the present disclosure, when two communicating parties are provided with a plurality of digital key code lists, it is often subsequently necessary for the two communicating parties to exchange information therebetween regarding which of the plurality of digital key code lists are to be employed when exchanging data in a secure manner, for example encrypted and/or obfuscated manner, between the two communicating parties. Such an approach employing a plurality of potential key code lists can be used to enhance security even further in embodiments of the present disclosure. Moreover, when a previous key code list is becoming exhausted, a new key code list is beneficially shared between the two communicating parties. In such a case, an ID of which key code list to be used will uniquely identify which key code list is being employed.

Even though no passwords are used in embodiments of the present disclosure, each user can be identified and authenticated according to legislation of each nation from where a given service is being provided; for example, legislation of certain nations may dictate that data can be examined by security authorities to detect any terrorist-type activities. Pursuant to embodiments of the present disclosure, the data security system focuses on controlling digital key code lists centrally, which means that the data security system potentially enables a user to sign-in securely and to use a foreign service, yet storing all his/her information into a data storage that is maintained according to a local, namely national, legislation. Therefore, the authentication message poses no threat either for its user or for an associated service provider, or for a nation where the service is being used.

It will be appreciated, in a case where it is detected that a key code list is used for malicious purposes, that the key code list may be rendered invalid; in other words, the key code list with that particular ID can then no longer be used in authentication or in signing-up to services.

Optionally, in this regard, the data security system is operable to deactivate a given digital key code list in an event that security has been found to have been compromised by information pertaining to the given digital key code list becoming available to an unauthorized third party, for example a hacker. Such deactivation is optionally implemented in response to a deactivation command, including an identification of the given digital key code list that is to be deactivated. Optionally, the deactivation command is issued by at least one of: the first party, the second party, a third party that is responsible to oversee security of communication occurring between the first and second parties.

Moreover, optionally, the data security system is operable to associate an expiration time with a given digital key code list, and to deactivate the given digital key code list when its expiration time has been reached.

Embodiments of the present disclosure increase security, because transactions occur only between authorized and authenticated parties, regardless of other technology used in services associated with the transactions. Thus, embodiments of the present disclosure are capable of preventing unknown and/or malicious, unauthorized, parties from producing unwanted services or to generate junk mail inside the data security system.

Pursuant to embodiments of the present disclosure, a more secure information society can be created by removing passwords as a concept, and by replacing the passwords with a model that is described in respect of embodiments of the present disclosure. Embodiments of the present disclosure potentially encompass all information systems used by human beings or devices (for example, artificial intelligence (AI) devices, robotic devices, and similar), so that the problems caused by users themselves can be pre-emptively prevented. Embodiments of the present disclosure are capable of addressing weakened protection and weak data security caused by outdated technologies, thereby making the future information society more reliable and more secure for its citizens, so that automatic information systems will function more independently and reliably. Thus, embodiments of the present disclosure are susceptible to being employed, for example, in banking apparatus and "fintech" systems where a very high degree of data security is required in order to avoid theft or fraud; "fintech" is an acronym that refers to financial banking technologies. Embodiments of the present disclosure are also susceptible to being used in critical infrastructure that has to be protected against third party hacking, for example load response provided in smart grid power systems and networks in response to temporally changing power demand and/or temporally changing power generating capacity.

Embodiments of the present disclosure make it possible for a user associated with a communicating party to sign in securely to a given service provided by another communicating party in a manner that the name of the user (namely, "user name"), an identification of the user or password are not transmitted in any stage of a signing-in process. By employing such an approach, the user may remain anonymous. Moreover, by employing the approach, it is not necessary to use an encrypted connection, because no such information is used or transmitted in the sign-in (i.e., signing-in) process that could cause harm to the user or could weaken the data security of the communicating party providing the given service. It will be appreciated that the signing-in can be optionally performed by using an unencrypted connection exactly for the reason that information to be delivered is not critical, yet the information itself can also be encrypted, in which case only an index for the key to be used from the key code list needs to be transmitted to support secure data exchange within a communication system.

Pursuant to embodiments of the present invention, a use of passwords is replaced with a digital key code list that is arranged to work automatically, without needing any actions by a given user.

Embodiments of the present disclosure enable a sign-in (i.e., signing-in) process to be implemented in a manner that it takes a local legislation of a country into account, provided that the authorities of that country have an opportunity to produce for their citizens encryption key pairs intended for official use. Such an embodiment is a considerable improvement in comparison to how communication between parties is performed in contemporary information society. Moreover, embodiments of the present disclosure make it possible to sign in securely also in an offline mode of operation. Such offline signing-in processes can be accomplished successfully, for example, at a user device, even if there were no network connection to a producer of the encryption key pairs.

Embodiments of the present disclosure are concerned with issues of security holes that afflict contemporary data security systems; thus, embodiments of the present disclosure are capable of replacing a need to use passwords altogether by employing disposable keys that are usable only once.

As a result, communicating parties do not necessarily need to set up and maintain a trust relationship that is mandatory in contemporary password-based implementations. In embodiments of the present disclosure, the trust relationship needs to exist solely between each communicating party and the producer of the keys, namely a trusted third party. Such a trusted third party may be a generally established notary public or a certification authority, depending on where a given service is produced and who is providing it.

Embodiments of the present disclosure make it possible to interact securely via use of the public Internet (Internet Protocol, IP), without worrying about aforementioned threats to security, because sensitive sign-in (i.e., signing-in) information, for example, such as a user identification, an e-mail address or password are not transmitted, either in encrypted form or unencrypted form, or as one-way hashes. There is no need to utilize, in embodiments of the present disclosure, any of: HyperText Transport Protocol Secure (HTTPS) protocol, Secure Sockets Layer (SSL) or Virtual Private Network (VPN) protection in the interaction. Moreover, in embodiments of the present disclosure, temporal event ID's such as "auth tokens" are not necessarily transmitted; such temporal event ID's are susceptible to being abused by malicious parties that intend to keep a track of when and where a user device of a user is used.

Such "auth tokens" can be used in embodiments of the present disclosure in the form of "session tokens" in situations where a current sign-in session is desired to be open for a pre-defined time period or until a pre-defined goal is met. As mentioned earlier, a session token is a unique identifier that is generated and sent from a server to a client to identify a current interaction session between the server and the client. Using such a session token is beneficial in that the client has to store and handle only the session token, while all session data is linked to the session token and stored at a database associated with the server.

For illustration purposes only, there will now be considered an example implementation of a sign-in (i.e., signing-in) process without passwords pursuant to embodiments of the present disclosure, wherein the sign-in (i.e., signing-in) process is performed between two communicating parties, namely a client and a server. In the example implementation, the sign-in (i.e., signing-in) process is performed in two phases as follows:

Phase 1:

In a phase 1, a digital key code list is produced by any one of: the client, the server or a trusted third party. Optionally, the digital key code list is assigned a serial number, for example, such as "abc-123".

The communicating parties are provided with identical, or otherwise compatible (namely, such that are capable of being used cooperatively for implementing embodiments of the present disclosure), copies of the digital key code list that include same keys and indices referencing the keys. For this purpose, for the first time, the digital key code list is delivered to the communicating parties using a secure mode of transfer. As an example, the secure mode of transfer can be implemented by way of a Public Key Infrastructure (PKI)-based encrypted communication, for example, such as Gurulogic Microsystem Oy's proprietary KWallet®, or by way of known Pretty Good Privacy (PGP®).

As another example, the digital key code list can be delivered by way of a file transfer using encrypted messages, for example, such as Near-Field Communication (NFC) or Bluetooth®, as long as it is absolutely certain that such file transfer can be executed securely.

As yet another example, the digital key code list can be delivered via an unencrypted memory card, for example a USB memory device (known colloquially as a "USB memory stick"), in a registered letter.

Before using the digital key code list, the communicating parties must make sure that the producer of the digital key code list is a trusted and authorized party and is not hampered by malicious parties. This is particularly important in cases when the digital key code list is transmitted over a data communication network, but is also important in cases when the digital key code list is received directly from another user physically. It will be appreciated that a digital key code list that cannot be trusted must never be used.

As an example, when using known PGP®, a trust relationship exists between a given user and a verifier of a public encryption key, whereas when using the Gurulogic Microsystem Oy's KWallet®, the trust relationship exists between a communicating party and the producer of the digital key code list.

It is to be noted here that the phase 1 will be repeated each time an existing digital key code list is required to be replaced with a new digital key code list, or in a case when the communicating parties do not yet have a common digital key code list, namely identical copies of the same digital key code list, in which case a digital key code list is required to be created, provided that the producer of the digital key code list is known and trusted. If the existing digital key code list being used is approaching its end, namely there are only a few unused keys left, then a new digital key code list is optionally delivered and agreed upon when there are still unused keys left; such a manner of operation is distinguished from known types of data security systems. In such a case, it is possible to perform the delivery of the new digital key code list from one of the communicating parties to the other of the communicating parties or from a trusted third party to both the communicating parties, without security problems, by using at least one of the unused keys left in the existing digital key code list.

Optionally, as well as being disposed of after use, as aforementioned, keys are time limited in their effect, to provide an additional degree of security protection. Optionally, the entire key code list is time-limited in its effect, requiring renewal of the key code list on a periodic basis.

With regard to a technical implementation, sign-in (i.e., signing-in) is allowed, for example, only between communicating parties that possess identical copies of the same digital key code list, or at least identical keys. Thus, embodiments of the present disclosure make it possible to deviate from conventional password-based sign-in (i.e. signing-in) procedures, and to produce keys to be used among user groups and groups of software components. This enhances the security of data communication between the communicating parties, as only certain known communicating parties can even attempt to sign in.

Phase 2:

In a phase 2, the communicating parties are able to sign-in, to each other's services, regardless of which signing-in method is used, for example as described in the foregoing. In the example, HyperText Transfer Protocol (HTTP) authentication in an unencrypted connection is used, in order to elucidate more clearly a usage scenario of the data security system pursuant to embodiments of the present disclosure and corresponding benefits so achieved, as compared to known prior art.

Hereinafter, the usage scenario of the data security system in HTTP authentication in an unencrypted connection is designated as "HTTP KWallet® Authentication" for the sake of convenience only.

In the example, a user device of the client (hereinafter referred to with an abbreviation "C") communicates with a service produced by the server (hereinafter referred to with an abbreviation "S").

In the example, the user device "C" connects to the service provided by the server "S" via the TCP port 80, using the traditional HTTP protocol, thus without using SSL encryption. The user device "C" transmits an HTTP request to the server "S"; the HTTP request is by default set to use the HTTP KWallet® Authentication method.

The user device "C" then proceeds to wait for a response from the server "S", so as to be informed whether or not the request was successful. According to the HTTP standard, a default success response code (see reference [10]) would then be "HTTP 200 OK".

In this regard, the server "S" processes the request received from the user device "C" and verifies the HTTP KWallet® Authentication method used in the request. Optionally, the HTTP request defines at least one of (for example, only one of, at least two of, at least three of, at least four of and so on):
(i) a digital key code list is used for the sign-in (i.e. signing-in) process;
(ii) the serial number of the digital key code list used by the user device "C";
(iii) a key index of a key used by the user device "C" to encrypt the sign-in (i.e., signing-in) information; and
(iv) an encrypted additional information.

The server "S" then verifies:
(a) whether or not the received serial number matches with a digital key code list owned by the server "5", and
(b) whether or not the received key index matches a key within the digital key code list owned by the server "5".

If the matching key is found, the server "5" verifies the authenticity and correctness of the signing-in process, and decrypts the encrypted additional information by using the key.

If an error occurs in the verification process, the server "S" optionally transmits the HTTP-response status code "HTTP 401 Unauthorized" to the user device "C", according to the default HTTP standard procedure. Alternatively, optionally, some other response can be transmitted, for example as determined by the HTTP KWallet® Authentication method, wherein such a response defines a manner in which the communicating parties operate in agreement with the HTTP KWallet® Authentication method.

As an example, in the Starwindow® sign-in (i.e. signing-in) process developed by Gurulogic Microsystems Oy, the encrypted information optionally includes a user's unique user identification, which in the Starwindow® process is the user's personal e-mail address. "Starwindow" is a proprietary software product manufactured by Gurulogic Microsystems Oy.

In operation, the encrypted information is verified to be associated with the used digital key code list. This is sufficient to detect possible cracking attempts and unauthorized usage, because the Starwindow® is the producer of the digital key code list and, therefore, can verify whether or not the serial number used in the sign-in (i.e. signing-in) attempt belongs to the user who attempted to sign in. This enables the Starwindow® process to exclude the digital key code list referred to by the serial number from being used by unauthorized users to whom the digital key code list does not belong.

Moreover, optionally, for embodiments of the present disclosure, any conceivable message or even a character sequence indicating date and time can be used as the additional information (namely, the encrypted information). Such messages are optionally used to replace actual user identification. Alternatively, optionally, such messages are combined with actual user identification, as long as the other communicating party or a trusted third party is able to recognize the message.

It will be appreciated that in order to use the HTTP KWallet® Authentication method, it is sufficient to transmit only the information of items (i) and (iii), namely defining that a digital key code list is to be used for the sign-in (i.e., signing-in) process and defining using the key index for providing the key to be used by the user device "C", if both communicating parties have received the digital key code list only for a certain dedicated purpose that is defined explicitly by the HTTP KWallet® Authentication method.

Optionally, in embodiments of the present disclosure, keys from the key code list are used that can be used for several needs, such as authentication, sign-in and data encryption.

As an example, the serial number of the digital key code list is not required to be transmitted if only one digital key code list is being used by the HTTP KWallet® Authentication method. As another example, the encrypted signing-in information is not required to be transmitted if the key has already been used to encrypt some other piece of information that is essential for data communication to work, for example, such as response information.

Furthermore, for illustration purposes only, there will now be considered a specific implementation example of the sign-in (i.e., signing-in) process, wherein the user device "C" is a Starwindow® terminal device that registers itself at the server "5", using the aforesaid HTTP KWallet® Authentication method, instead of known standard HTTP Basic and Digest Access Authentication methods (see reference [11]). The user device "C" transmits an HTTP GET message to the server "S". The HTTP KWallet® Authentication method signals as a first parameter of authorization information, for example a 64-bit serial number of the digital key code list; it will be appreciated that serial numbers of other lengths can be optionally used when implementing embodiments of the present disclosure. A second parameter of the authorization information is an index referencing the key that is used from the digital key code list, which in the illustrated example references the key at a first slot "1" of the digital key code list. A third parameter of the authorization information is the encrypted sign-in information, which is the date and time when the sign-in attempt takes place, optionally together with a Starwindow® user identification string that has been encrypted with the key referred to by the second parameter. In addition to encryption, the third parameter has also been converted to a hexadecimal format. In the example below the sign-in information uses 96 characters.

After verifying the authorization information, the server "S" replies with the standard HTTP result code "200 OK", indicating that the registering was completed successfully.

C: GET/signal/device/register/5776046 HTTP/1.1<cr><lf>
C: Host: signal.starwindow.net<cr><lf>
C: Authorization: KWallet 0123456789ABCDEF 1 06BE6D5A3E5D471EA3687088F647A54E214E284473C 0773A00CA46BE599 82E236D3B75794555E8B2D29 2AA3E37 87386C<cr><lf>
C: <cr><lf>
S: HTTP/1.1 200 OK<cr><lf>
S: Date: Fri, 8 Jul. 2016 06:29:14 GMT<cr><lf>
S: Access-Control-Allow-Origin: *<cr><lf>
S: Content-Type: application/xml<cr><lf>
S: Content-Length: 290<cr><lf>
S: Server: Starwindow Signal<cr><lf>
S: <cr><lf>
S: <290 bytes of response content>

Additionally, optionally, the server "5" generates a session token that identifies the current interaction session between the server "5" and the user device "C", and sends information indicative of the session token as a part of an HTTP response header (namely, other than 200, e.g., 401) with an additional "WWW-Authenticate" field, which describes the digital key code list that has been used, the key index of the encryption key and the session token as encrypted. As an example, the "WWW-Authenticate" field can be represented as follows:
WWW-Authenticate: realm="restricted", token="0123456789ABCDEF 2 E367FA5E"

The client "C" then sends, to the server "5", subsequent data along with this session token, wherein at least the session token is sent in an encrypted form. This enables the server "5" to identify the subsequent data as a valid communication during the current interaction session.

In a second aspect, embodiments of the present disclosure provide a method of operating a data security system including at least a first party and a second party that are mutually coupled via a data communication arrangement, wherein the data communication arrangement is operable to provide for user authentications and/or user sign-in, characterized in that the method includes:
(a) providing the first and second parties with identical or mutually compatible copies of at least one digital key code list that includes keys and indices referencing the keys;
(b) arranging for the first party to be operable to deliver to the second party an authentication message including, instead of a key, an index of the key, a unique ID of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and
(c) arranging for the first and second parties to be operable to use, when performing data communication therebetween, for providing user authentications and/or user sign-in, the key that is derived from the digital key code list based upon the index included within the authentication message, and to dispose of the key after use, wherein the key is arranged to be usable only once between the first and second parties.

Optionally, the additional information is encrypted using precisely that encryption key whose index was delivered during the authentication. Alternatively, optionally, the additional information is encrypted using some other encryption key, for example a next key in the key code list, in which case a fact that the next key is used is already known to the receiving party. Yet alternatively, optionally, the additional information is encrypted using another encryption key, whose index is delivered separately.

It will be appreciated that the method is susceptible to being implemented as a continuous process, such that data communication between the first and second parties is encrypted optionally using one or more other keys from the digital key code list, as described earlier. Optionally, in this regard, keys are changed for each message that is communicated between the first and second parties, and their indices are either delivered, or are implicitly known to the receiving party, for example when the keys are used in a specific order. This prevents man-in-the-middle attacks in the data communication from arising. In other words, even if a malicious third party manages to hijack the authentication message, the malicious third party would not be able to perform data communication with the receiving party, because the malicious third party does not have access to the digital key code list that defines the subsequent communication between the authorized parties.

According to an embodiment of the present disclosure, the method includes arranging for the key to be selected for use by any one of: the first party, the second party, or a trusted third party.

According to an embodiment of the present disclosure, the method includes mutually authorizing and authenticating the first and second parties.

According to an embodiment of the present disclosure, the method includes arranging for the digital key code list to be provided by the first party or the second party.

According to another embodiment of the present disclosure, the method includes arranging for the digital key code list to be provided by a trusted third party.

Optionally, the method includes arranging for the first party to be operable to perform the data communication anonymously, when the digital key code list is provided by the trusted third party.

According to an embodiment of the present disclosure, the method includes arranging for the data security system to be operable to allow access to the digital key code list based upon biometric identification of users associated with the first and second parties.

Optionally, the method includes arranging for the data security system to be operable to deactivate a given digital key code list in an event that security has been found to have been compromised by information pertaining to the given digital key code list becoming available to an unauthorized third party. Such deactivation is optionally implemented in response to a deactivation command, including an identification of the given digital key code list that is to be deactivated. Optionally, the deactivation command is issued by at least one of: the first party, the second party, a third party that is responsible to oversee security of communication occurring between the first and second parties.

Moreover, optionally, the method includes arranging for the data security system to be operable to associate an expiration time with a given digital key code list, and to be operable to deactivate the given digital key code list when its expiration time has been reached.

In a third aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned second aspect.

Optionally, the computer-readable instructions are downloadable from a software application store, for example, from an "App store" to the computerized device.

Next, embodiments of the present disclosure will be described with reference to figures.

Figure 1:
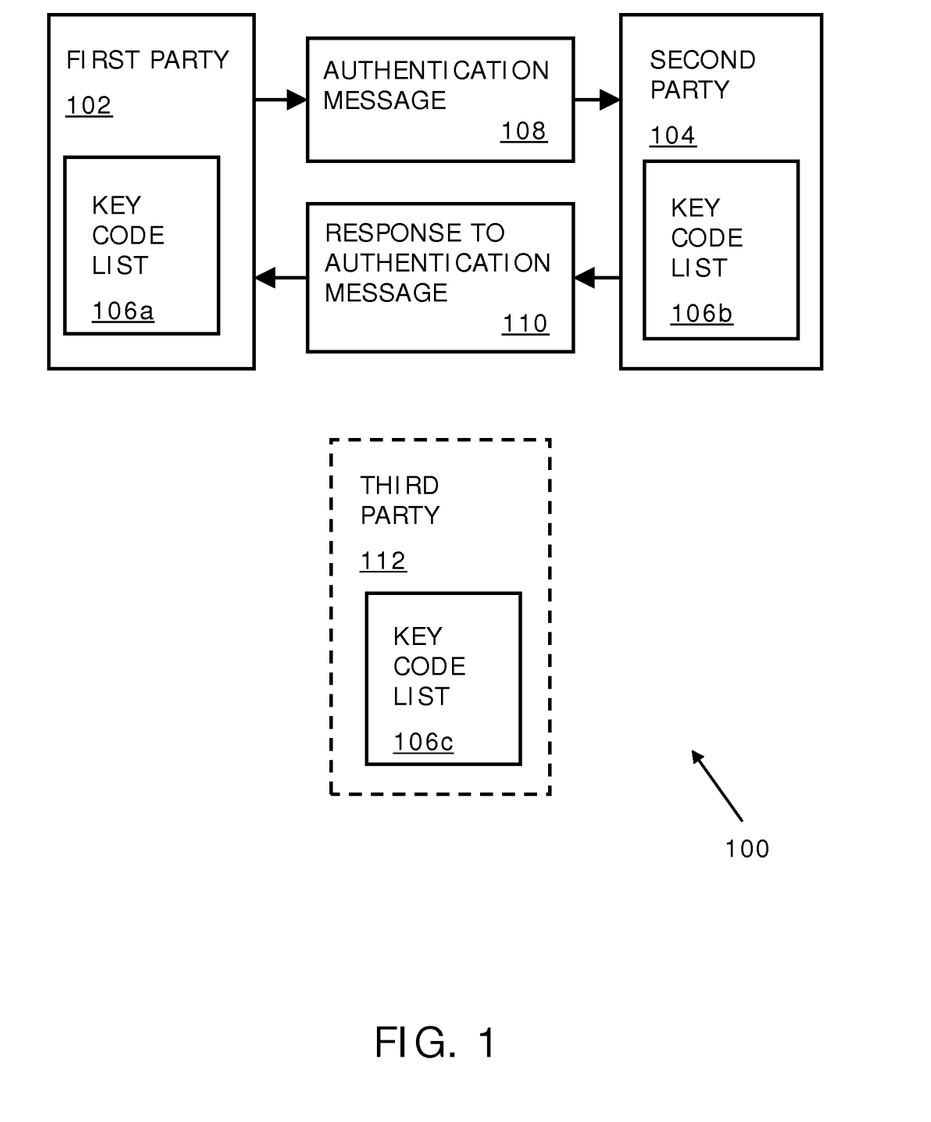
FIG. 1 is a schematic illustration of a data security system, in accordance with an embodiment of the present disclosure.

Referring to FIG. 1, there is provided a schematic illustration of a data security system 100, in accordance with an embodiment of the present disclosure. The data security system 100 includes a first party 102 and a second party 104 that are mutually coupled via a data communication arrangement. The first party 102 and the second party 104 are provided with identical copies of a digital key code list, depicted as 106a and 106b in FIG. 1, respectively. Optionally, there is also a third party 112 operating in conjunction with the first party 102 and the second party 104 for providing the digital key code list 106c.

The first and second parties 102 and 104 are operable to use, when performing authentication, sign-in, and data communication therebetween, a key from the digital key code list(s) 106a and 106b, respectively, and to dispose of the key after use. The key is arranged to be usable only once between the first and second parties 102 and 104. Optionally, the key is time-limited in effect, to increase security within the data security system 100.

In operation, the first party 102 transmits an authentication message 108, based upon which the second party 104 transmits a response 110 indicating whether or not the authentication was successful. Instead of authentication, the message 108 can also be used for signing-in (to a service).

FIG. 1 is merely an example, which should not unduly limit the scope of the claims herein. It is to be understood that the specific designation for the data security system 100 is provided as an example and is not to be construed as limiting the data security system 100 to specific numbers, types, or arrangements of communicating parties. There can be also a group of communicating parties involved, all of which thus use a key code list with the same ID. A person skilled in the art will recognize many variations, alternatives, and modifications of embodiments of the present disclosure.

Figure 2A:
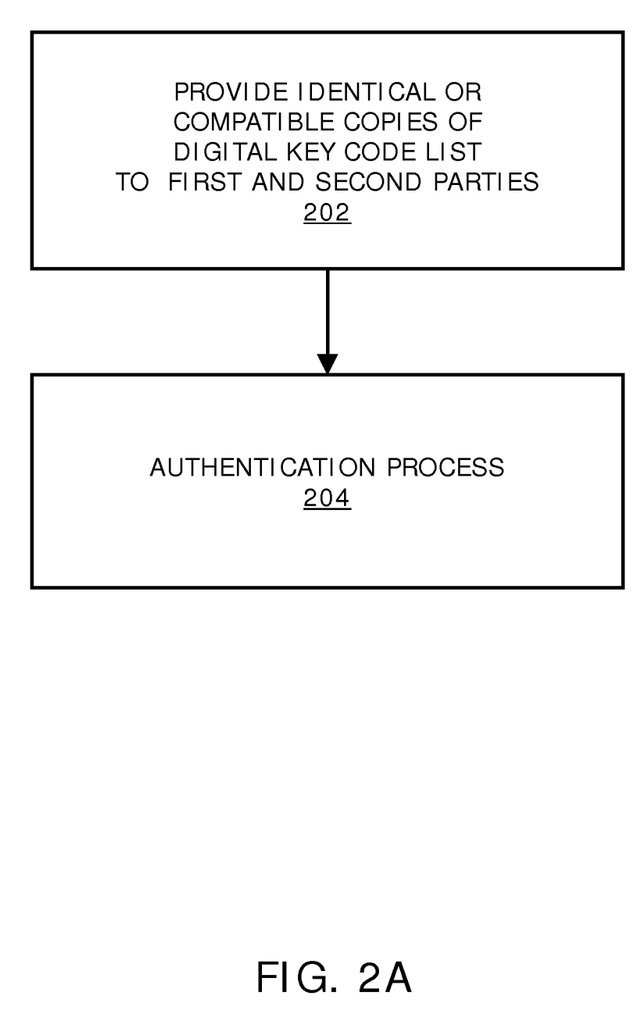
FIG. 2A is a schematic illustration of a flow chart depicting steps of a method of operating a data security system of FIG. 1, in accordance with an embodiment of the present disclosure.

Referring next to FIG. 2A, there is provided a flow chart depicting steps of a method of operating a data security system, for example the data security system 100, including a first party and a second party that are mutually coupled via a data communication arrangement, in accordance with an embodiment of the present disclosure. The method is depicted as a collection of steps in a logical flow diagram, which represents a sequence of steps that can be implemented in hardware, software, or a combination thereof, for example as aforementioned.

At a step 202, namely concerning a receipt of key code list(s), the first and second parties are provided with identical or mutually compatible copies of a digital key code list that includes keys and indices referencing the keys.

At a step 204, namely concerning an authentication process, an arrangement is made for the first party to be operable to deliver to the second party an authentication message including an index of a key to be derived, a unique ID of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form.

Additionally, an arrangement is made for the first and second parties to be operable to use, when performing data communication therebetween, the key that is derived from the digital key code list, and to dispose of the key after use. In accordance with the step 204, the key is arranged to be usable only once between the first and second parties. Optionally, the key is time-limited in effect, to increase security within the data security system 100.

The steps 202 to 204 are only illustrative and other alternatives can also be provided where one or more steps are added without departing from the scope of the claims herein.

Figure 2B:
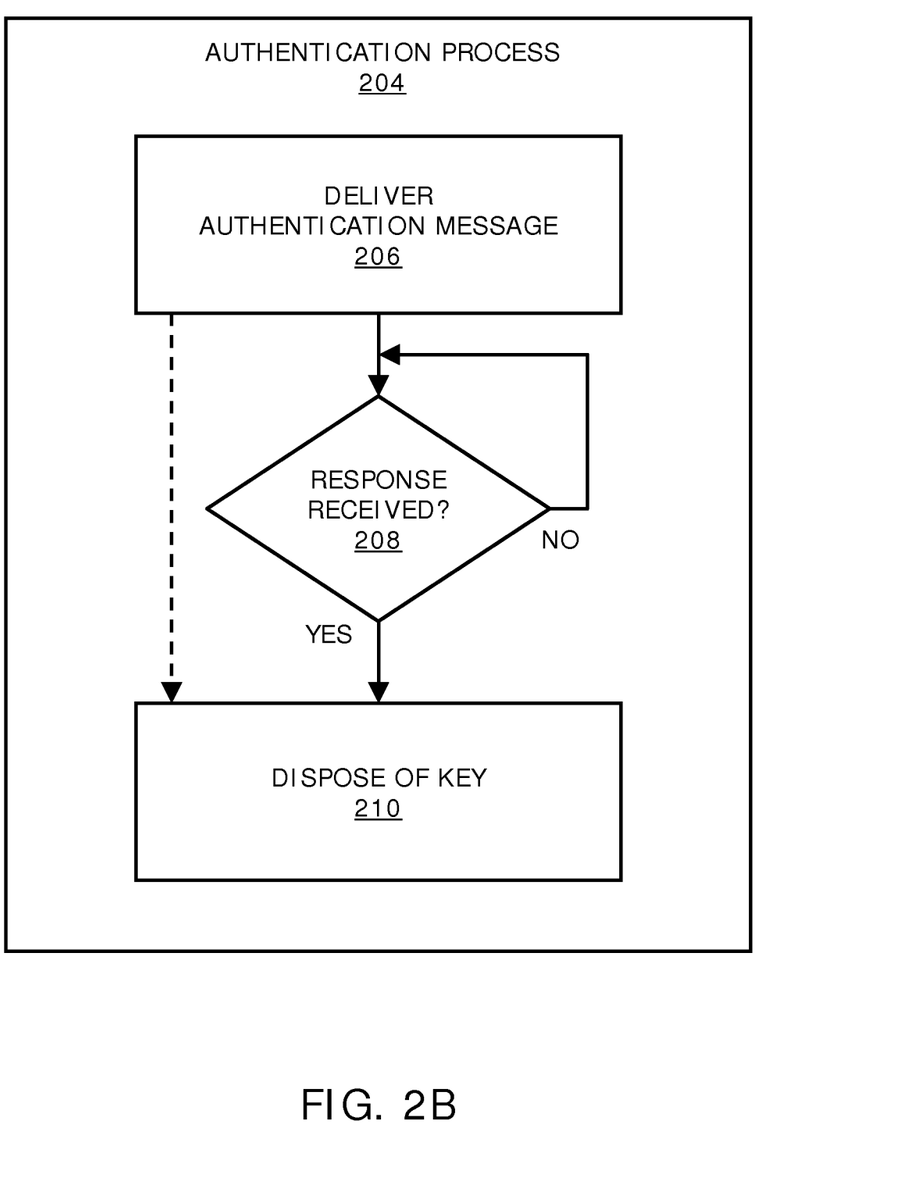
FIG. 2B is a schematic illustration of a flow chart depicting steps of an authentication process, in accordance with an embodiment of the present disclosure.

Referring next to FIG. 2B, there is provided a flow chart depicting steps of the authentication process 204. At a step 206, the first party sends the authentication message to the second party in order to sign-in, for example to a service provided by the second party. After having received a qualifying response, at a step 208, the process continues to a sign-in process, wherein the key is derived from the key code list based upon the index included within the authentication message. Finally, at a step 210, the used key is disposed of.

Optionally, the first party selects the key that is to be used, and then proceeds to wait for the response from the second party. The used key is then disposed of immediately after use, or after the response has arrived.

It will be appreciated that the method is susceptible to being implemented as a continuous process, such that the data communication between the first and second parties is encrypted optionally using one or more other keys from the digital key code list, as described earlier. Optionally, in this regard, keys are changed for each message that is communicated between the first and second parties, and their indices are either delivered, or are implicitly known to the receiving party, for example when the keys are used in a specific order. This prevents man-in-the-middle attacks in the data communication from arising. In other words, even if a malicious third party manages to hijack the authentication message, the malicious third party would not be able to perform data communication with the receiving party, because the malicious third party does not have access to the digital key code list that defines the subsequent communication between the authorized parties, namely the first and second parties.

The steps 206 to 210 are only illustrative and other alternatives can also be provided where one or more steps are added without departing from the scope of the claims herein.

Figure 3:
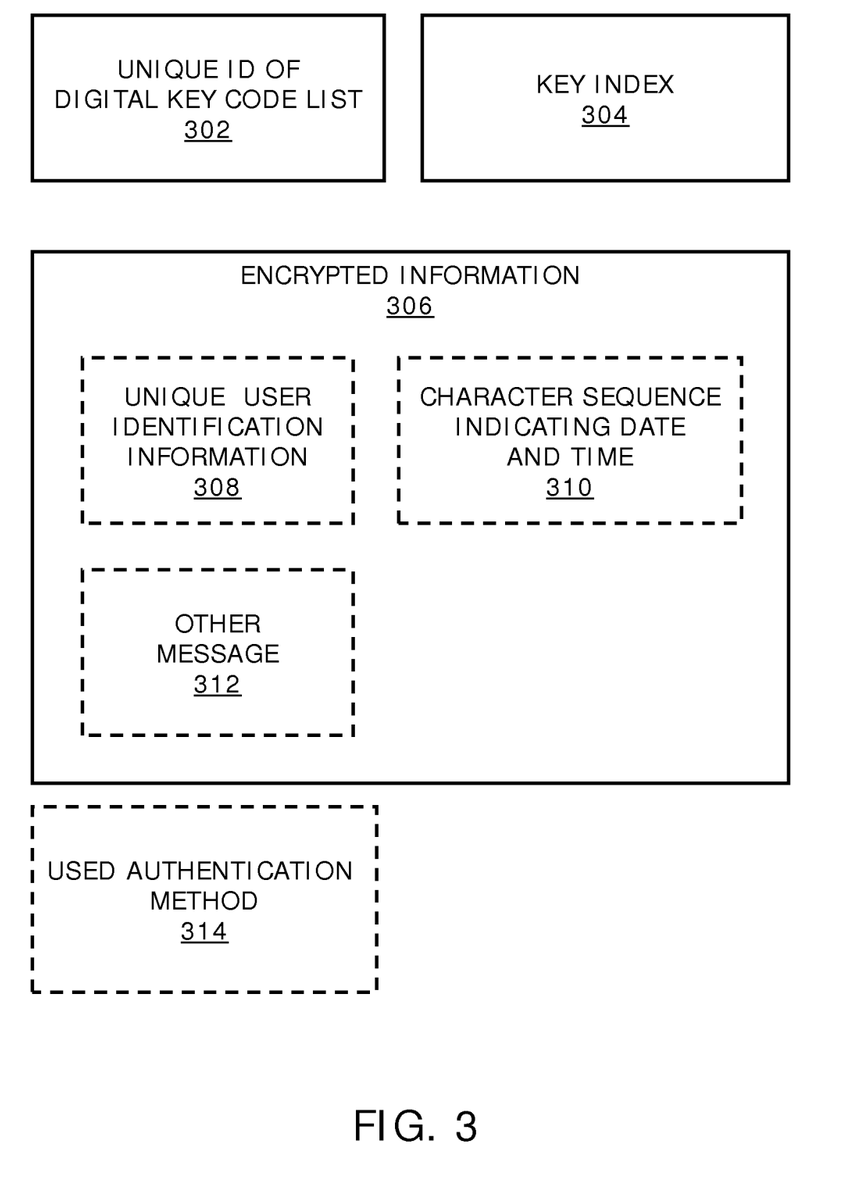
FIG. 3 is an illustration of a content of an example authentication message, according to an embodiment of the present disclosure.

Referring next to FIG. 3, there is illustrated the content of an example authentication message, in accordance with an embodiment of the present disclosure.

With reference to FIG. 3, the authentication message includes a unique ID 302 of a digital key code list. The authentication message further mandatorily includes a key index 304 referencing a key.

Additionally, the authentication message includes encrypted information 306. The encrypted information 306 includes at least one of: unique user identification information 308, a character sequence 310 indicating a date and time when the authentication message is being sent, one or more other messages 312, for example, including a session token previously-received from a given party to which the authentication message is to be delivered. Moreover, optionally, the authentication message includes information indicative of an authentication method used, wherein the information is denoted by 314.

Moreover, it will be appreciated that the contents of the authentication message can be provided within the authentication message in any order. FIG. 3 is merely an example, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "two of", and similarly "one or more" are to be construed in a likewise manner. Numerals included within parentheses in the accompanying claims are intended to assist understanding of the claims and should not be construed in any way to limit subject matter claimed by these claims.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

[1]

We claim:

1. A data security system including at least a first party and a second party that are mutually coupled via a data communication arrangement, wherein the data communication arrangement is operable to provide for user authentications and/or user sign-in, characterized in that: (i) the first and second parties, implemented using at least one hardware processor, are provided with identical or mutually compatible copies of at least one digital key code list that includes keys and indices referencing the keys; (ii) the first party is operable to deliver to the second party an authentication message including, instead of a key, an index of the key, a unique identifier (ID) of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and (iii) the first and second parties are operable to use, when performing data communication there between, for providing user authentications and/or user sign-in, the key that is derived from the digital key code list based upon the index included within the authentication message, and to dispose of the key after use, wherein the key is arranged to be usable only once between the first and second parties.

2. A data security system of claim 1, wherein the key is selected for use by any one of: the first party, the second party or a trusted third party.

3. A data security system of claim 1, wherein the first and second parties are mutually authorized and authenticated.

4. A data security system of claim 1, wherein the digital key code list is provided by the first party or the second party.

5. A data security system of claim 1, wherein the digital key code list is provided by a trusted third party.

6. A data security system of claim 5, wherein the first party is operable to perform the data communication anonymously, when the digital key code list is provided by the trusted third party.

7. A data security system of claim 1, wherein the data security system is operable to allow access to the digital key code list based upon biometric identification of users associated with the first and second parties.

8. A data security system of claim 1, wherein the data security system is operable to deactivate a given digital key code list in an event that security has been found to have been compromised by information pertaining to the given digital key code list becoming available to an unauthorized third party.

9. A data security system of claim 1, wherein the data security system is operable to associate an expiration time with a given digital key code list, and to deactivate the given digital key code list when its expiration time has been reached.

10. A method of operating a data security system including at least a first party and a second party that are mutually coupled via a data communication arrangement, wherein the data communication arrangement is operable to provide for user authentications and/or user sign-in, characterized in that the method includes: (a) providing the first and second parties, implemented using at least one hardware processor, with identical or mutually compatible copies of at least one digital key code list that includes keys and indices referencing the keys; (b) arranging for the first party to be operable to deliver to the second party an authentication message including, instead of a key, an index of the key, a unique identifier (ID) of a digital key code list from which the key is to be derived, and additional information indicative of at least one of: a unique user ID associated with the first party, a session token previously-received from the second party, a date and time at which an attempt for user authentications and/or user sign-in is made, wherein the additional information is provided in an encrypted form; and (c) arranging for the first and second parties to be operable to use, when performing data communication there between, for providing user authentications and/or user sign-in, the key that is derived from the digital key code list based upon the index included within the authentication message, and to dispose of the key after use, wherein the key is arranged to be usable only once between the first and second parties.

11. A method of claim 10, wherein the method includes arranging for the key to be selected for use by any one of: the first party, the second party or a trusted third party.

12. A method of claim 10, wherein the method includes mutually authorizing and authenticating the first and second parties.

13. A method of claim 10, wherein the method includes arranging for the digital key code list to be provided by the first party or the second party.

14. A method of claim 10, wherein the method includes arranging for the digital key code list to be provided by a trusted third party.

15. A method of claim 14, wherein the method includes arranging for the first party to be operable to perform the data communication anonymously, when the digital key code list is provided by the trusted third party.

16. A method of claim 10, wherein the method includes arranging for the data security system to be operable to allow access to the digital key code list based upon biometric identification of users associated with the first and second parties.

17. A method of claim 10, wherein the method includes arranging for the data security system to be operable to deactivate a given digital key code list in an event that security has been found to have been compromised by information pertaining to the given digital key code list becoming available to an unauthorized third party.

18. A method of claim 10, characterized in that the method includes arranging for the data security system to be operable to associate an expiration time with a given digital key code list, and to be operable to deactivate the given digital key code list when its expiration time has been reached.

19. A computer program product comprising a non-transitory computer-readable storage medium having computer-readable instructions stored thereon, the computer-readable instructions being executable by a computerized device comprising processing hardware to execute a method as claimed in claim 10.

* * * * *